2,911,328
PRINTABLE TETRAFLUOROETHYLENE POLYMER INSULATED WIRE AND METHOD OF MAKING SAME

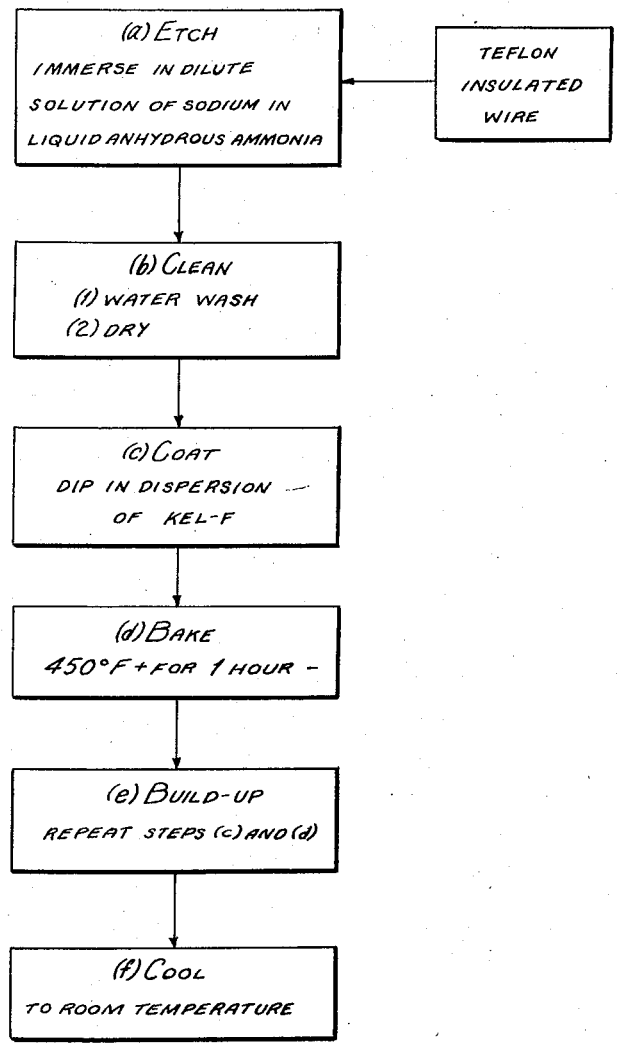

Robert Goldsmith, Great Notch, N.J.

Application October 16, 1957, Serial No. 690,459

6 Claims. (Cl. 117—218)

My invention relates to a printable tetrafluoroethylene polymer insulated wire and method of making the same and more particularly to a tetrafluoroethylene polymer insulated wire coated with a polymer of trifluorochloroethylene.

The plastic formed by a polymer of tetrafluoroethylene is known to the art under the trade name of "Teflon" and is manufactued by E. I. du Pont de Nemours and Co. For purposes of convenience I shall employ the trade name "Teflon" in designating tetrafluoroethylene polymer and like fluoro-carbon polymers. Teflon is characterized by outstanding chemical resistance, excellent electrical properties and good heat stability. It is especially useful as insulation for wire and other electronic parts which are subject to high frequency current and high temperature. It is therefore especially useful as an insulating material for electric wires to be employed in high temperature environment. In making conductor harnesses and in wiring electrical apparatus and electronic equipment, the conductors are advantageously printed or color-coded. Unfortunately, Teflon is both oleophobic and hydrophobic. Accordingly, it is repellent to and nonwettable by oils as well as water. Teflon surfaces are accordingly passive toward inks, dyes and adhesives. They cannot therefore be conveniently printed or color coded.

Another plastic having good electrical insulation properties which is chemically stable and possesses excellent chemical resistance is the polymer of trifluorochloroethylene. A brand of this plastic is manufactured by M. W. Kellogg Company and sold under the trade name, "Kel-F." For purposes of convenience I shall refer to the polymer of trifluorochloroethylene and like chlorine containing fluorocarbon polymers as "Kel-F" in describing my invention. Kel-F, unlike Teflon, can be printed or color-coded. A surface of Kel-F may be readily imprinted by commercial stamping machines using temperatures in the vicinity of 400° F. with foils employed with such stamping machines. These stamping machines are commonly employed to print initials on leather, luggage and the like. Kel-F has toughness and scuff resistance, that is, resistance to abrasion greatly superior to that possessed by Teflon.

While Kel-F is an excellent insulator, unfortunately, it cannot be applied directly over copper or copper bearing metal. When this is done, the Kel-F is "poisoned" by the copper and deteriorates. Attempts to use Kel-F as insulating material have been made by silver plating copper and then applying the Kel-F over the silver surface. This has not been completely satisfactory owing to the fact that the silver plating is discontinuous in some places and the poisoning occurs. Besides this, silver plating copper wiring is an expensive procedure.

The desired high temperature, high dielectric insulation, therefore, can be obtained only by using Teflon over copper wire. Besides being nonprintable, such Teflon insulated wire cannot be potted. Besides this, the low coefficient of friction presented by the slippery surface of Teflon interferes with its use for making inductive windings. Such Teflon insulated wire windings have a tendency to slip on themselves. This is especially important if the inductive windings are subjected to acceleration either from rotation or in certain military uses. While Teflon has excellent temperature and dielectric properties, it lacks toughness and scuff resistance, that is, resistance to abrasion. In some uses Teflon insulation has actually been scuffed from the wire causing a failure of insulation.

One object of my invention is to provide a printable Teflon insulated wire.

Another object of my invention is to provide a Kel-F coated Teflon insulated wire.

Another object of my invention is to provide a Teflon insulated wire which is protected by a sleeve of Kel-F enabling the insulated wire to be printed and to be potted and affording the insulated wire protection from abrasion.

Other and further objects of my invention will appear from the following description.

In general my invention contemplates providing Teflon insulated wire with a sleeve of Kel-F. The Kel-F sleeve may then be imprinted or color-coded as desired and the Kel-F sleeved Teflon insulated wire may be potted. I may, if desired, first etch the surface of Teflon to ensure that the Kel-F sleeve will become firmly bonded and attached to the Teflon. A Teflon surface may be etched with a solution of sodium in liquid anhydrous ammonia.

The accompanying drawing which forms part of the instant specification and which is to be read in conjunction therewith is a schematic view showing the steps of a process according to my invention and capable of producing a Kel-F coated Teflon insulated wire.

More particularly in one embodiment of my invention the Teflon wire is first etched by dipping it into a dilute solution of metallic sodium and liquid ammonia. The solution may be formed by incorporating 1.4% by weight of metallic sodium in liquid ammonia at −33° C. The Teflon coated wire is passed through the solution at a rate of about four to six feet per minute or faster. The wire may, if desired, be briefly preheated to around 200° C. This heating is not necessary. In any event, however, the dipped wire is washed in water and then dried. The surface of the Teflon insulation will be found to be etched. The surface of Teflon may be etched in other ways known to the art. For example, it may be subjected to reaction with alkali metals, alkaline earth metals, manganese or zinc, at a temperature sufficient to cause reaction between the metal and the Teflon. This reaction may be carried out by vapor deposition of the metals in a vacuum.

I then dip the etched Teflon insulated wire into a dispersion of Kel-F. Such Kel-F dispersions are commercially available and usually contain about four pounds of Kel-F per liquid gallon. For most applications I find it advantageous to reduce the concentration of the solid phase by adding more liquid or solvent, such as xylol to the dispersion.

A concentration of about two pounds of Kel-F solid to the liquid gallon is sufficient for coating over the Teflon insulated wire. It will be understood, of course, that there is a relationship between the speed of passage of the wire through the Kel-F dispersion and the concentration of Kel-F in the dispersion and the thickness of the Kel-F coating obtained. In general it will be found that the lower the concentration of Kel-F and the lower the speed of passage of the Teflon coated wire through the dispersion the thinner will be the Kel-F coating obtained with one pass. Conversely, the higher the concentration of solids in the Kel-F dispersion and the higher the speed of passage of the Telflon coated wire through the Kel-F dispersion the thicker will be the coating obtained with a single pass. The dispersion adheres to the etched Teflon surface with ease. It is then baked at a temperature of above 40° F.

Kel-F actually starts to soften in excess of 400° F. Even at 450° F. it takes a long time for the Kel-F coating to fuse. If this is the temperature to be employed it will take about one hour before the finely divided Kel-F particles fuse into a smooth coat. The Kel-F dispersion may be pigmented a desired color. Such color in itself may act as a color code. If the wire is to be printed, it is usually preferable to pigment the Kel-F white. It may then be imprinted readily with black letters for maximum visibility.

In practice I prefer to fuse the Kel-F at a temperature in excess of 480° F. This shortens the time of baking to a matter of minutes. By rapid production I may expose the freshly coated wire to a circumambient temperature of 800° F. for a total time of several seconds. This will "flash" fuse the Kel-F coating without affecting the wire and its Teflon insulation adversely.

The Kel-F coating will, of course, be quite thin with only one application and will generally be of insufficient thickness. I prefer, therefore, to repeat the coating and baking steps at least once, or advantageously several additional times. In this manner I obtain a thicker coating of Kel-F which is not only printable but has several other advantages. When the legend or code is printed into the Kel-F the printed material is protected by the Kel-F and is made resistant to solvents and such corrosive environments as concentrated nitric acid. I have, for example, soaked printed Kel-F coated Teflon insulated wire in concentrated nitric acid for over forty-eight hours with no visible adverse effect. The Kel-F imparts a toughness, scuff resistance and resistance to abrasion to the Teflon insulated sheath. Kel-F itself being an excellent insulation adds to the dielectric strength of the insulation and forms a tighter less porous film than does Teflon alone.

Some Teflon insulated wires, such as magnet wire, are so fine and fragile that they can be injured by picking up a spool of such wire incorrectly. It is extremely difficult to handle the wire itself without doing injury to it. The Teflon coating, it will be understood, covering such fine wire is extremely thin and it is susceptible to injury during the etching step. I have found it advantageous, therefore, to coat such Teflon coated wire directly without the interim etching step. The Kel-F dispersion forms a film around the Teflon when it is dipped in such Kel-F dispersion. This film can be fused to form a thin coating. Such coating has the form of an elongated sleeve. If a section of Kel-F coated Teflon magnet wire is cut from a length of wire the sleeve can be readily stripped or slid from the section axially. There is no adhesion of the Kel-F sleeve to the Teflon insulation. Such lack of adhesion, however, in an elongated coil of wire is not disadvantageous. We are able to apply the Kel-F sleeve over the Teflon insulated wire without harming the Teflon insulation by the sodium etching. Because the wire is thin it is desirable to be able to strip the ends of the wire without too much difficulty owing to the fineness of the magnet wire. The Kel-F sleeve is in close contact with the Teflon even though it is not bonded to it. Nevertheless the sleeve can be imprinted or color coded and does protect the Teflon insulation. Such Kel-F coated Teflon insulated wire can be readily potted or formed into windings over armatures or stators, which windings will not have a tendency to slip upon themselves.

This is important for wire which is employed in military end uses. Such wire is always subject to acceleration and deceleration tests which will emphasize the tendency of Teflon insulated wire to slip upon itself when wound into coils for inductors.

It will be seen that I have accomplished the objects of my invention. I have provided a printable Teflon insulated wire. I have provided a Kel-F coated Teflon insulated wire, thereby enabling the Teflon insulated wire to be printed, to be potted or to be wound into inductances, or all of these.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A conductive copper wire provided with an insulating sheath of tetrafluoroethylene polymer in contact with the copper and a sheath of trifluorochloroethylene polymer surrounding the tetrafluoroethylene polymer in contact therewith and bonded thereto.

2. A method of coating a tetrafluoroethylene polymer insulated wire including the steps of dipping the tetrafluoroethylene polymer coated wire in a dispersion of trifluorochloroethylene polymer, fusing the trifluorochloroethylene polymer dispersion on the tetrafluoroethylene polymer surface by heating it to a temperature above 450° F. and repeating said dipping and fusing steps to build up a sheath of trifluorochloroethylene polymer in contact with the tetrafluoroethylene polymer insulation.

3. A method of forming printable tetrafluoroethylene polymer insulated wire including the steps of immersing the tetrafluoroethylene polymer insulated wire in a dilute solution of sodium in liquid anhydrous ammonia to etch the tetrafluoroethylene polymer surface, cleaning the etched tetrafluoroethylene polymer surface, dipping the etched tetrafluoroethylene polymer surface in a dispersion of trifluorochloroethylene polymer and fusing the dispersion of trifluorochloroethylene polymer on the etched tetrafluoroethylene polymer surface.

4. A method as in claim 3 in which said fusing step includes heating the trifluorochloroethylene polymer dispersion coating to a temperature above 450° F.

5. A method of making printable tetrafluoroethylene polymer insulated wire including the steps of etching the tetrafluoroethylene polymer surface of the insulated wire by immersing it in a dilute solution of sodium in liquid anhydrous ammonia, water washing and drying the etched tetrafluoroethylene polymer surface, dipping the etched surface in a dispersion of trifluorochloroethylene polymer, fusing the trifluorochloroethylene by heating it to a temperature above about 480° F. to form a sleeve of trifluorochloroethylene polymer bonded to the tetrafluoroethylene polymer insulation and repeating the dipping and fusing steps to build up the trifluorochloroethylene sleeve.

6. A method of coating tetrafluoroethylene polymer insulated wire including the steps of etching the surface of the tetrafluoroethylene polymer insulated wire, dipping the etched Teflon surface in a dispersion of trifluorochloroethylene polymer and fusing the dispersion of trifluorochloroethylene polymer on the etched tetrafluoroethylene polymer surface.

References Cited in the file of this patent

UNITED STATES PATENTS

| | | |
|---|---|---|
| 2,686,770 | Dipner | Aug. 17, 1954 |
| 2,694,650 | Herman et al. | Nov. 16, 1954 |
| 2,718,511 | Sprung et al. | Sept. 20, 1955 |
| 2,789,063 | Purvis et al. | Apr. 16, 1957 |